United States Patent [19]
Taber et al.

[11] 3,901,274
[45] Aug. 26, 1975

[54] VALVE ACTUATING SYSTEM

[75] Inventors: Bruce D. Taber, Boxford; Michael J. Cronin, Salem, both of Mass.

[73] Assignee: General Electric Company, Schenectady, N.Y.

[22] Filed: Oct. 29, 1973

[21] Appl. No.: 410,929

[52] U.S. Cl. .............. 137/567; 60/402; 60/720; 137/637; 415/152 R
[51] Int. Cl.² .............. F15B 13/09; F16K 11/22
[58] Field of Search ...... 60/386, 402, 404; 137/567, 137/637

[56] References Cited
UNITED STATES PATENTS
2,836,960  6/1958  Wittren .............................. 60/386
3,468,126  9/1969  Mercier ........................... 60/402 X OTHER PUBLICATIONS
"State of the Art" publication of General Electric dated Fall, 1970, pp. 6-7, and 2 pages containing FIGS. 1–12 submitted by applicants.

Primary Examiner—Martin P. Schwadron
Assistant Examiner—Richard Gerard
Attorney, Agent, or Firm—John F. Ahern; James W. Mitchell

[57] ABSTRACT

A valve actuating system is comprised of a pair of valves spring-biased to their closed positions, a pair of hydraulic actuators, each controlling one of the valves, and means for introducing pressurized fluid into the actuators. The actuators are so arranged that when pressurized fluid is introduced into the actuators, the valves are sequentially moved in opposite directions, thus closing one valve and then opening the other. The means for introducing pressurized fluid includes two pressure sources for actuation of the valves, a pair of solenoid valves and hydraulic circuitry, all interconnected, so that fluid can be introduced from either pressure source. Emergency and fail-safe closure of the valves is also provided by biasing the valves to their closed positions.

5 Claims, 3 Drawing Figures 3,901,274

VALVE ACTUATING SYSTEM

BACKGROUND OF THE INVENTION

1. Field of the Invention

This invention relates to valve actuating systems, and more particularly to an improved system for sequentially acutating a pair of valves in opposite directions.

2. Description of the Prior Art

The prior art shows valve actuating systems in which a pair of valves are either independently or simultaneously actuated in opposite directions. Such systems are most frequently used in controlling the flow of motive fluid to turbines used to drive ships, as is shown in U.S. Pat. No. 3,422,831 issued in the name of Straney et al., and assigned to the assignee of the present invention. In the prior art, as shown by Straney et al., a hydraulic pump supplies fluid under pressure to a hydraulic motor which acts through a system of clutches and rack-and-pinion gearing to actuate the valves.

The present invention provides a simple hydraulic valve actuating system in which each valve of a pair of valves is directly controlled by a separate hydraulic actuator. The actuators are interconnected so that pressurized fluid introduced to the actuators will cause each valve to move in an opposite direction from the other. The valves are spring-biased to their closed positions so that the open valve will close before the closed valve opens. Because the valves are hydraulically actuated and spring-biased to their closed positions, the system is fail-safe in the event of failure or removal of hydraulic pressure. Hydraulic actuation also allows the valves to be manually operated in the event of a power failure. The valve actuating system of the present invention is effectively adapted to shipboard application, such as that shown in the aforementioned patent issued to Straney et al, by including controls which position the valves by controlling the introduction of pressurized fluid to the actuators.

SUMMARY OF THE INVENTION

It is a general object of this invention to provide a new and improved valve actuation system.

It is another object of this invention to provide a valve actuating system which utilizes a hydraulic system to positively position a pair of valves at alternate times in selectively either an open or closed direction.

It is still another object of this invention to provide, in a valve actuating system of the type described, fail-safe operation of the valves by spring-biasing the valves toward their closed positions so that they close automatically should hydraulic pressure be removed or lost.

It is still a further object of the invention to provide a valve actuating system which includes a hydraulic system having alternate pressure sources, one primary and one secondary, and arranged such that transfer from one pressure source to the other may be performed without the need of electrical energy.

It is a still further object of the present invention to provide a valve actuating system of the type described for controlling the introduction of motive fluid to an ahead and an astern turbine which provide propulsive force for a ship.

In one embodiment of the invention, two hydraulic actuators are provided for sequentially actuating two valves. Each actuator controls one of the valves and is comprised of the conventional actuator rod and piston. The actuators are hydraulically interconnected by two conduits so that introducing pressurized fluid into either of the conduits will cuase the actuator rods and pistons of each actuator to move in opposite directions. By suitably connecting the actuator rods to the valves, the valves can be sequentially actuated in opposite directions by selectively introducing pressurized fluid into the actuators. A means for selectively introducing pressurized fluid is included in order to provide hydraulic fluid for system operation.

In a second embodiment, the valve actuating system of the present invention includes a variable displacement pump as the primary source, a handpump as a manual secondary source and hydraulic circuitry interconnecting the primary and secondary pressure sources.

In a third embodiment, the valve actuating system of the present invention includes a feedback control system to control the introduction of pressurized fluid to the conduits interconnecting the actuators.

BRIEF DESCRIPTION OF THE DRAWINGS

A more complete understanding of this invention may be had by reference to the specification when taken in conjunction with the accompanying drawings, wherein.

DETAILED DESCRIPTION OF THE INVENTION

Figure 1:
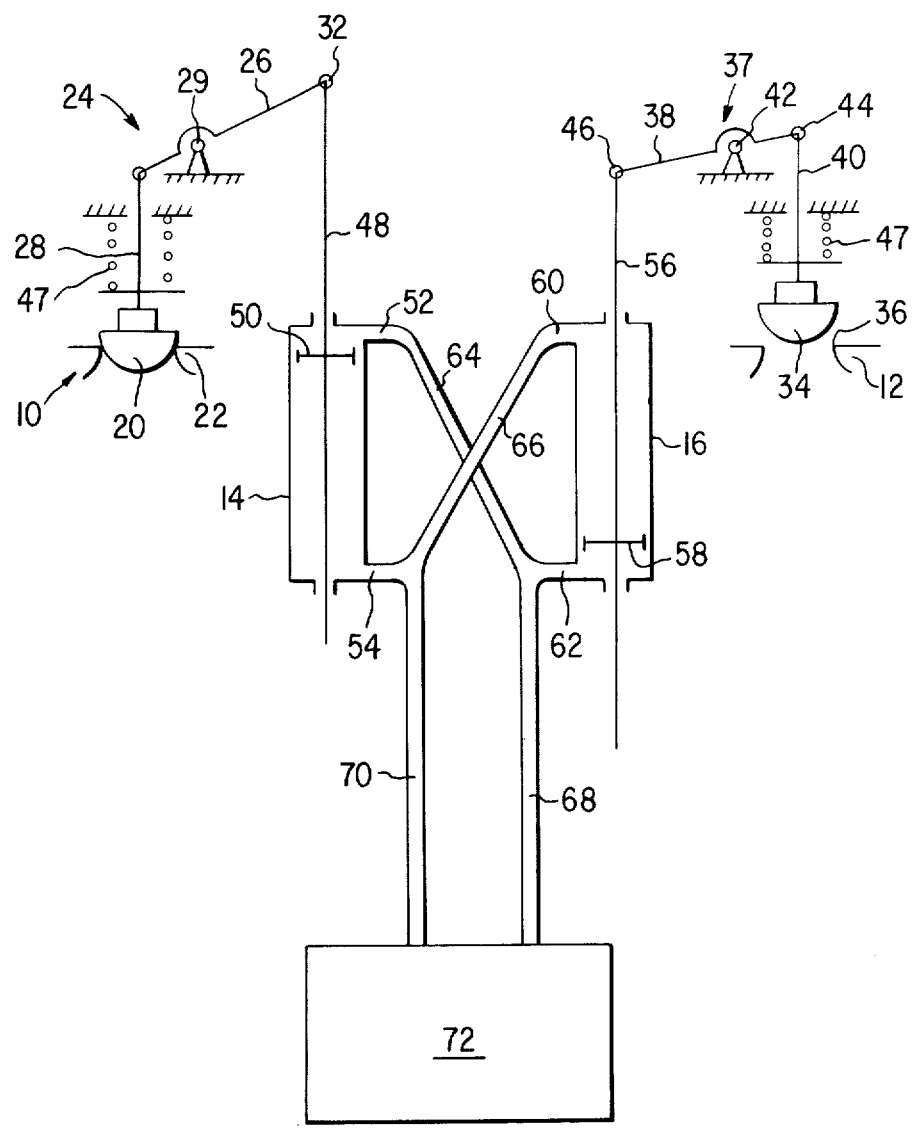
FIG. 1 is a schematic diagram of the valve actuating system of the present invention, showing the arrangement of the hydraulic actuators and their relation to the valvea and the means for introducing pressurized fluid.

Referring now to FIG. 1, there is shown a first valve 10 and a second valve 12. A first actuator 14 controls the movement of the first valve 10 and a second actuator 16 controls the movement of the second valve 12.

The first valve 10 is comprised of a valve member 20 and a valve seat 22. A linkage 24, comprised of a lever arm 26 and a link 28, transfers motion of the actuator 14 to the valve member 20. The lever arm 26 is pivoted at a fulcrum 29 located intermediate of the two ends 30 and 32 of the lever arm 26. One end of the link 28 is pivoted at end 30 of lever arm 26 and the other end of link 28 is attached to valve member 20. The second valve 12 is comprised of a valve member 34 and valve seat 36, motion to valve member 34 being transferred from actuator 16 by a linkage 37 similar to linkage 24. Linkage 37 is comprised of a lever arm 38 and link 40. The lever arm 38 is pivoted at a fulcrum 42 located intermediate of the two ends 44 and 46 of the lever arm 38. One end of link 40 is pivoted at end 44 of lever arm 38 and the other end of link 40 is attached to valve member 34. Springs 47 are provided to bias valves 10 and 12 toward their closed positions at all times. The linkage shown herein is intended to be by way of example only; one skilled in the art will perceive other configurations which will perform as linkages 24 and 37 do without departing from the spirit of the invention.

The first actuator 14 is of conventional construction having an actuator rod 48 and a piston 50. One end of the actuator rod 48 is pivoted to end 32 of lever arm 26. The first actuator has a first port 52 and a second port 54. The first port 52 is disposed so that when pressurized fluid is introduced therethrough, the piston 50 will move in such a manner that the first valve 10 moves toward its open position by the action of linkage 24 and actuator rod 48. The second port 54 is disposed so that when pressurized fluid is introduced therethrough, the first valve 10 moves toward its closed position by linkage 24 and actuator rod 48 being moved by piston 50. The second actuator has the conventional actuator rod 56 and piston 58. One end of the actuator rod 56 is pivoted to end 46 of lever arm 38. The second actuator has a first port 60 and a second port 62. The first port 60 is disposed so that when pressurized fluid is introduced therethrough, the piston 58 will move in such a manner that the second valve 12 moves toward its open position by the action of linkage 37 and actuator rod 56. The second port 62 is disposed so that when pressurized fluid is introduced therethrough, the second valve 12 moves toward its closed position by linkage 37 and actuator rod 56 being moved by piston 58.

A first conduit 64 communicates with the first port 52 of the first actuator 14 and with the second port 62 of the second actuator 16. A second conduit 66 communicates with the second port 54 of the first actuator 14 and with the first port 60 of the second actuator 16.

Means are provided for selectively introducing pressurized fluid into the first conduit 64 and into the second conduit 66 in order to control the motion of the first valve 10 and the second valve 12. Means for selectively introducing pressurized fluid into conduits 64 and 66 are comprised of pipes 68 and 70 which convey fluid to the first conduit 64 and the second conduit 66, respectively, and a hydraulic system 72 which selectively introduces fluid to pipes 68 and 70. Hydraulic system 72 includes a reversible variable displacement pump (see FIG. 2) of the type disclosed in the aforementioned Straney et al patent, and its construction and operation are known to those skilled in the art. The reversible variable displacement pump is continuously run by an electric motor (not shown) and the pump has a slide block therein (not shown) whose position controls the output of pressurized fluid to the pipes 68 and 70. The slide block position is controlled by any suitable means, such as servo-control means which acts in response to an error control signal, as described in connection with FIG. 3. By varying the position of the slide block, various amounts of fluid may be pumped into pipes 68 and 70, thus controlling the position of the pistons 50 and 58 and obtaining a desired position of the valves 10 and 12. The reversible variable displacement pump herein described is contemplated only as exemplifying one embodiment of the invention. It is clearly within the scope of the applicants' invention to provide pump means and associated apparatus of a type other than a reversible variable displacement pump for introducing pressurized fluid into the conduits 64 and 66.

In operation, when pressurized fluid is introduced into the first conduit 64, the first actuator 14 tends to move the first valve 10 towards its open position while at the same time, because of the pressurized fluid being simultaneously introduced into the second actuator 16 through port 62, the second actuator 16 tends to cause the second valve 12 to move toward its closed position. If there were an equal reaction on both actuators, this movement would take place simultaneously. However, since the open second valve 12 is spring-biased toward its closed position, it moves first to a completely closed position. Thereafter, the closed first valve 10, which also is biased toward its closed position, opens so that the movement takes place sequentially. Reversal of the procedure and admission of fluid into the second conduit 66 first causes the now open first valve 10 to move first to a closed position, followed by opening of the still closed second valve 12. Movement always takes place in the proper sequence to first close the open valve and then open the closed valve. It should also be noted that the closed valve is always held closed by hydraulic pressure while the other valve is opening.

The valve actuating system of the present invention also is well adapted for emergency situations where it is desirable to rapidly close the valves 10 and 12. When pressure in the hydraulic system is removed, springs 47 will act on the valve members 20 and 34 in order to move them to their closed positions. While it may be desirable to close the valves as an emergency measure until the cause of the problem can be located, it is also desirable to be able to operate the valves manually in order to allow the equipment which the valves control to operate until repairs can be made. This is especially important if the valves are used to provide motive fluid to turbines which provide propulsive force for a ship. Without some provision for manual operation, the ship may not be capable of returning to port.

Figure 2:
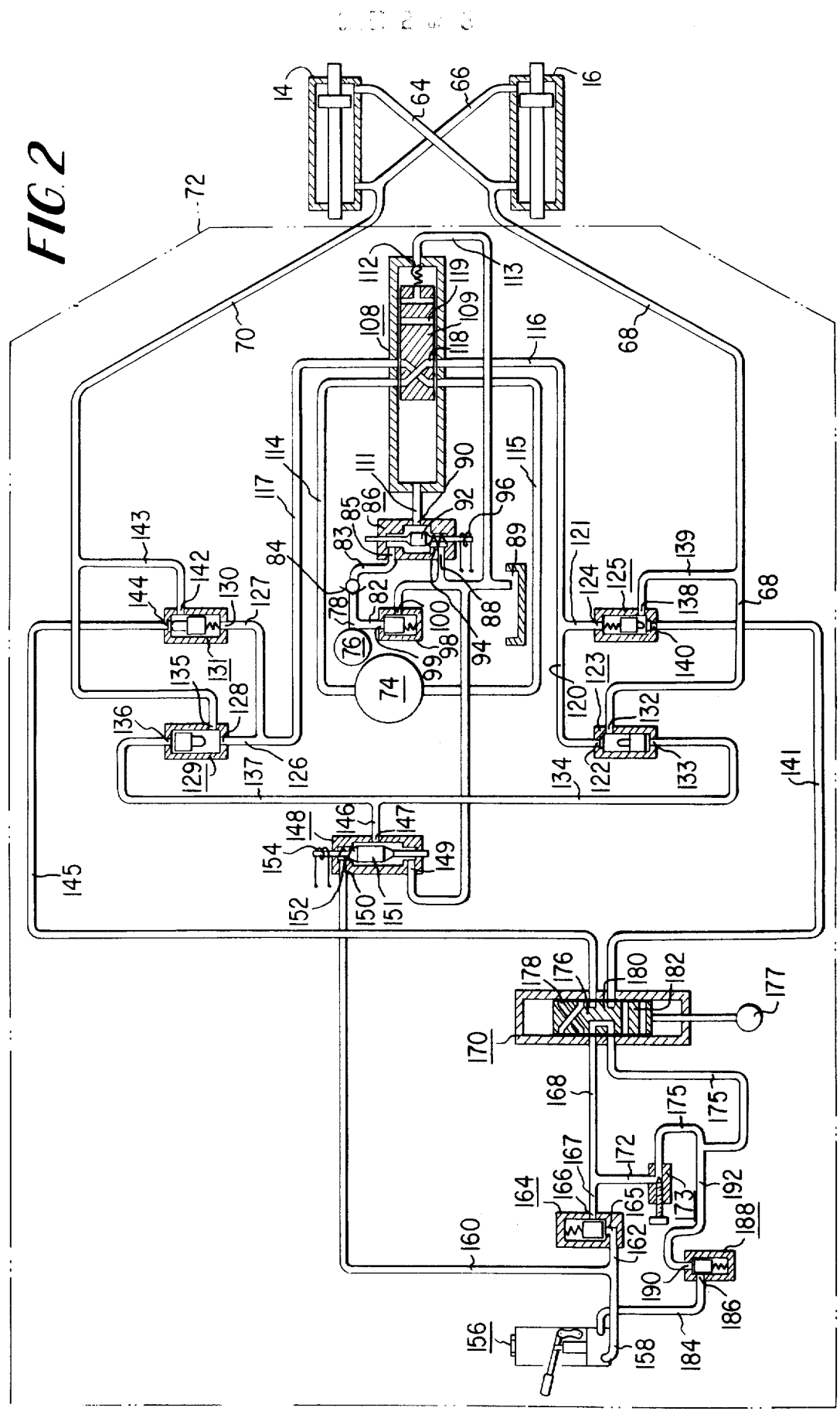
FIG. 2 is a schematic diagram of the valve actuating system of the present invention showing the interconnection of primary and manual secondary pressure sources.

In accordance with the desirability of providing manual operation, reference is made to FIG. 2 wherein a second embodiment of the present invention is shown. Hydraulic system 72 further includes manual secondary pressure source which is hydraulically interconnected with a reversible variable displacement pump, which acts as a primary pressure source in this embodiment.

The reversible variable displacement pump 74 and a fixed displacement pump 76 are driven by an electric motor (not shown). Fixed displacement pump 76 has an output line 78 which branches into lines 82 and 83. Line 83 is connected through a check valve 84 to input port 85 of a first valve means, here shown as first solenoid valve 86. Valve 86 also includes a vent port 88, vented to a reservoir 89 maintained at or near atmospheric pressure, a trip valve port 90 and a valve body 92. Valve body 92 is moved within valve 86 by a spring 94 and solenoid coil 96. When solenoid coil 96 is energized so that valve 86 occupies its first position, valve body 92 is moved to seal vent port 88, placing input port 85 in communication with trip valve port 90. When solenoid coil 96 is de-energized so that valve 86 occupies its second position, valve body 92 is moved by spring 94 to seal input port 85, placing vent port 88 in communication with trip valve port 90. A relief valve 98 has an input port 99, with which line 82 communicates, and a vent port 100 vented to reservoir 89. The pressure in line 83 is kept at a predetermined level by relief valve 98 and check valve 84 permits flow in line 83 only in a direction away from pump 76.

A trip valve 108 has an axially movable spool 109. Line 111 is connected between one end of trip valve 108 and trip valve port 90 of first solenoid valve 86. A spring 112 biases spool 109 against movement due to pressure introduced by line 111. The other end of trip valve 108 is vented to reservoir 89 by line 113.

Variable displacement pump 74 is connected through lines 114 and 115 to ports at opposite sides of trip valve 108. Spool 109 includes two hydraulic connecting means for interconnecting lines 113, 114, 115, 116 and 117 to form two predetermined hydraulic circuits depending on the position of spool 109. When spool 109 is in its rightmost position (shown in FIG. 2), the first hydraulic connecting means 118 connects line 114 with line 116 and line 115 with line 117. When spool 109 is in its leftmost position, the second hydraulic connecting means 119 connects line 114 with line 115 and lines 116 and 117 with line 113.

Line 116 branches into lines 120 and 121, with line 120 connected to the nose port 122 of valve 123 and line 121 connected to the pilot port 124 of a valve 125. Line 117 branches into line 126 and 127, with line 126 connected to the nose port 128 of a valve 129 and line 127 connected to the pilot port 130 of a valve 131. Valve 123 has a side port 132 to which pipe 68 (see FIG. 1) is connected and a pilot port 133 to which a line 134 is connected. Valve 129 has a side port 135 to which pipe 70 (see FIG. 1) is connected and a pilot port 136 to which a line 137 is connected. Valve 125 has a side port 138, which is connected by a line 139 to pipe 68, and a nose port 140 to which a line 141 is connected. Valve 131 has a side port 142, which is connected by a line 143 to pipe 70, and a nose port 144 to which a line 145 is connected. Valves 125 and 131 are spring-biased to seal nose ports 140 and 144, respectively, until a predetermined pressure exists at those nose ports.

Lines 134 and 137 join and form a line 146, which is connected to pilot port 147 of a second valve means, here shown as second solenoid valve 148. Valve 148 also includes a vent port 149 vented to reservoir 89, an input port 150, and a valve body 151. Valve body 151 is moved within valve 148 by a spring 152 and a solenoid coil 154. When solenoid coil 154 is energized so that valve 148 occupies its first position, valve body 151 is moved to seal input port 150, placing pilot port 147 in communication with vent port 149. When solenoid coil 154 is de-energized so that valve 148 occupies its second position, spring 152 moves valve body 151 to seal vent port 149, placing pilot port 147 in communication with input port 150.

A manually operated hydraulic pump 156 has an output line 158 which branches into line 160 and line 162. Line 160 is connected to input port 150 of second solenoid valve 148. A relief valve 164 has an input port 165 to which line 162 is connected and an output port 166. The pressure in line 160 is kept at a predetermined level by relief valve 164. Output port 166 has a line 167 connected thereto, which line 167 branches into line 168, which is connected to a manual selector valve 170, and line 172, which is connected to one side of a bleed valve 173. The other side of bleed valve 173 is connected to manual selector valve 170 by line 175 and bleed valve 173 includes a screw for controlling the amount of flow passing between lines 172 and 175.

Manual selector valve 170 has a spool 176, whose position is set by a handle 177, and lines 141 and 145 are connected to selector valve 170. Spool 176 includes three hydraulic connecting means for interconnecting lines 141, 145, 168, and 175 to form three predetermined hydraulic circuits depending on the position of spool 176. When spool 176 is in its lowermost position, the first hydraulic connecting means 178 connects line 168 with line 141 and line 175 with line 145. When spool 176 is in its intermediate position (shown in FIG. 2), the second hydraulic connecting means 180 connects line 168 with line 175 and blocks off lines 141 and 145. When spool 176 is in its uppermost position, the third hydraulic connecting means 182 connects line 168 with line 145 and line 175 with line 141.

Manual hydraulic pump 156 also includes a return line 184, which is connected to the output port 186 of a relief valve 188. The input port 190 of relief valve 186 is connected to line 175 by line 192.

In normal operation, variable displacement pump 74 supplies hydraulic fluid under pressure to either line 114 or 115, depending on the position of the slide block of variable displacement pump 74, and fixed displacement pump 76 supplies hydraulic fluid under pressure to line 83. Solenoid coils 96 and 154 are energized, placing valve 86 and 148 in their first positions. Fluid passes through first solenoid valve 86 to line 111 and spool 109 of trip valve 108 is held in its rightmost position against spring 112. The pressure in line 83, and thus the pressure against spool 109, is maintained at a predetermined value by relief valve 98.

If it is determined to open valve 12, hydraulic pressure must be introduced into conduit 66 (see FIG. 1). The slide block of reversible variable displacement pump 74 is placed in a position so that hydraulic fluid flows away from pump 74 in line 115. This hydraulic fluid is introduced to valve 129 through line 117 and hydraulic connecting means 118. Hydraulic fluid passes through line 126, through valve 129 and into pipe 70 which moves actuator 16 to open valve 12. Flow through valve 129 is unrestricted by virtue of the venting of pilot port 136 through line 137 and second solenoid valve 148, while flow through line 143 is prevented since pressure in line 127 passes through pilot port 130 of valve 131 and seals nose port 144 closed. As valve 12 opens, fluid enters pipe 68 and returns to pump 74 through valve 123, line 120, line 116, hydraulic connecting means 118 and line 114. Valves 123 and 125 are held in their respective positions similar to the manner in which valves 129 and 131, respectively, are held in the positions just described. In order to so hold valves 123 and 125, reversible variable displacement pump 74 is "supercharged," a term which those skilled in the art recognize as meaning that lines 114 and 115 both carry hydraulic fluid under pressure significantly higher than atmospheric pressure, with flow being induced by having one of these lines at a pressure higher than the other. Those skilled in the art will also recognize that to open valve 10 and close valve 12, the slide block of pump 74 is positioned so that hydraulic fluid flows away from pump 74 in line 114. This introduces fluid into pipe 68 and moves actuator 14 to open valve 10. Fluid returns to pump 74 in a manner similar to that described above.

To convert to manual operation, during which manual hydraulic pump 156 is used, coil 96 of first solenoid valve 86 and coil 154 of second solenoid valve 148 are de-energized, placing valves 86 and 148 in their second positions. Spring 94 of solenoid valve 86 moves valve body 92 to cut communication between lines 83 and 111 and to connect line 111 to reservoir 89, causing trip valve spool 109 to be moved to its leftmost position by spring 112. This moves hydraulic connecting means 119 into position, connecting line 114 with line 115 and connecting lines 116 and 117 to reservoir 89 through line 113.

Spring 152 of second solenoid valve 148 moves spool 151 to its lower position to cut communication between reservoir 89 and line 147 and to connect line 160 to line 146. Operation of hand pump 156 introduces fluid under pressure to line 160 and line 162. Fluid from line 160 passes through second solenoid valve 148 and enters line 146, from which the fluid enters lines 134 and 137, which communicate with pilot ports 133 and 136 of valves 123 and 129, respectively, to seal nose ports 122 and 128 of valves 123 and 129, respectively. As pressure builds in line 160 and reaches a predetermined value, relief valve 164 cracks, and fluid enters line 167.

Bleed valve 173 has been closed, cutting communication between lines 172 and 175. If valve 12 is to be opened, handle 177 is moved so that spool 176 of selector valve 170 is in its uppermost position, bringing hydraulic connecting means 182 into position. Hydraulic fluid then enters line 145 from line 168, passes through valve 131 to line 143 and enters pipe 70, thus moving actuator 16 to open valve 12. Fluid in actuator 16 returns to pump 156 through pipe 68, valve 125, line 141, hydraulic connecting means 182, line 175, line 192, relief valve 188 and line 184.

Fluid is prevented from flowing through valves 123 and 129 due to the pressure at pilot ports 133 and 136, respectively. Valves 125 and 131 are allowed to open under pressure at nose ports 140 and 144, respectively, because pilot ports 124 and 130, respectively, are vented to reservoir 89. To open valve 10 while system 72 is in the configuration just described, bleed valve 173 is opened to bleed fluid from high pressure line 172 to low pressure line 175, thus increasing pressure in pipe 68 and opening valve 10 an amount regulated by the amount of pressurized fluid which is allowed to pass from line 172 to line 175 through bleed valve 173. It will be apparent to those skilled in the art that should it be desired to open valve 10 initially, handle 177 is moved to place spool 176 of selector valve 170 into its lowermost position. This brings hydraulic connecting means 178 into position and causes valve 10 to open in a manner similar to that described immediately above in which valve 12 was opened. Bleed valve 173 then can be utilized to open valve 12.

When an emergency is encountered during the operation of reversible variable displacement pump 74 and it is desired to close valves 10 and 12 rapidly, solenoid coil 96 is de-energized and valve body 92 cuts communication between lines 85 and 111, simultaneously venting line 111 to reservoir 89. Spool 109 of trip valve 108 moves so that hydraulic connecting means 119 is in position, isolating pump 74 and venting nose ports 122 and 128 of valves 123 and 129, respectively, to reservoir 89. Springs 47 (see FIG. 1) move actuators 14 and 16, causing fluid to enter either pipe 68 or pipe 70, depending on their position when the emergency was encountered, which fluid vents, through valve 123 or 129, and hydraulic connecting means 119, to reservoir 89.

When an emergency is encountered during operation of manually operated pump 156, solenoid coil 154 is energized. This removes pressure from pilot ports 133 and 136 of valves 123 and 129, respectively, permitting springs 47 to move actuators 14 and 16 as described in connecting with emergency procedures during operation of pump 74.

Thus, the valve actuating system of the present invention is readily adapted to manual operation, or rapid emergency shutdown, as well as normal operation by provision of the hydraulic system herein described.

Figure 3:
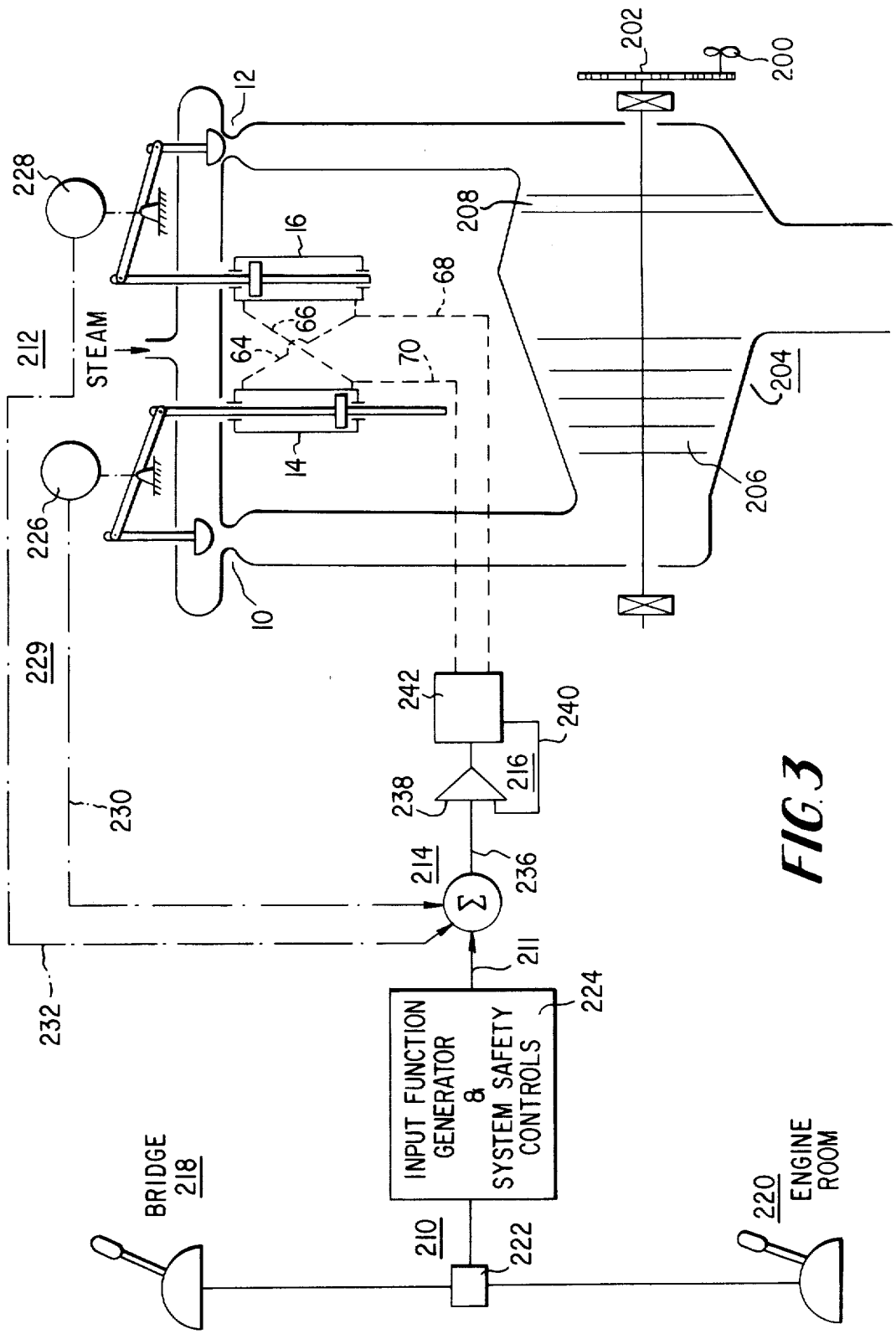
FIG. 3 is a schematic diagram of the valve actuating system of the present invention showing its inclusion into a shipboard propulsion system.

Referring now to FIG. 3, a third embodiment of the present invention is shown in which the valve actuating system of the subject invention controls the introduction of motive fluid to turbines supplying propulsive force to a ship. The means for selectively introducing pressurized fluid to the conduits 64 and 66 is shown as further including a feedback control system generally of the type shown in the aforementioned Straney et al patent. In that patent, as here, the power to drive a ship's propeller 200 is provided through gearing 202 and a pair of turbines 204. The pair of turbines 204 comprises an ahead turbine 206 and an astern turbine 208 for driving the ship in the ahead and astern directions, respectively. Steam is introduced to the ahead turbine 206 by the first valve 10 and to the astern turbine 208 by the second valve 12.

The feedback control system comprises means 210 for introducing an input command signal 211, a first means 212 for developing a position signal which is representative of the valves' positions, and a second means 214 for developing an error signal which is determined by the difference between the input command signal introduced by means 210 and the position signal developed by first means 212. Servo-control means 216, which is responsive to the error signal, positions the slide block of the reversible variable delivery pump 74. This position controls the introduction of pressurized fluid to conduits 64 and 66.

The means 210 for introducing an input command signal comprises a console 218 located at the bridge of a ship and a console 220 located in the ship's engine room. A switch means 222 is provided for controlling which input, bridge or engine room, will control the position of the valves. The means 210 for introducing an input command signal also comprises circuitry 224 for placing the input command signal in a form which is usable to the system and also may include safety controls suitably interconnected to solenoid valves 86 and 148 (see FIG. 2) in order to automatically provide for manual operation or emergency shutdown. The circuitry 244 is of a type well known in the art, and for details, reference is made to the aforementioned Straney et al patent.

The first means 212 for developing a position signal comprises two synchros 226 and 228, the synchros being responsive to the position of the valves 10 and 12, respectively. Synchros 226 and 228 develop a position signal 229, comprised of a first position signal 230 representative of the position of first valve 10 and a second position signal 232 representative of the position of second valve 12. The synchros are of the type which is well known to those skilled in the art and therefore a detailed description is not given here; for details as to the type of synchros which may be used, reference may again be made to the aforementioned Straney et al patent.

The second means 214 is also a synchro, similar to those used to develop the position signal, which second means 214 takes input command signal 211, compares it with position signals 230 and 232 and develops an error signal 236. The error signal 236 represents the difference between the input command signal, 211 and position signals 230 and 232.

Servo-control means 216 comprises an amplifier 238, feedback loop 240 and means (not shown) for generating a feedback signal responsive to the output of a pump means 242. In the embodiment shown, pump means 242 is comprised of reversible variable displacement pump 74 (see FIG. 2). Error signal 236 is introduced to amplifier 238 which generates a signal which controls the position of the slide block of the reversible variable displacement pump 74. The means for generating a feedback signal responsive to the output of the pump means 242 is responsive to the position of the slide block, is a manner shown in the aforementioned Straney et al patent. The feedback signal is carried by the feedback loop 240 to the amplifier 238, where it is compared with the error signal 236. Since the error signal determines the desired slide block position and the feedback signal carried by feedback loop 240 is representative of the actual slide block position, the valves 10 and 12 will have attained the position "called for" by the input command signal when the difference between the error signal and the feedback signal is zero. It is understood, of course, that without departing from the invention, the pump means 242 may be other than a reversible variable displacement pump, provided it has associated therewith means for generating a signal responsive to its output.

Although several specific embodiments of the invention have been shown, those skilled in the art will perceive modifications other than those specifically pointed out which can be made without departing from the invention, and it is intended by the appended claims to cover all such modifications as fall within the true spirit and scope of the invention.

Having thus described the invention, the following is claimed:

1. A valve actuating system including first and second valves actuated by fluidly cross-connected hydraulic valve actuators supplied with a pressurized fluid; first and second springs biasing the first and second valves, respectively, toward a closed position; and, means for selectively introducing pressurized fluid into the valve actuators comprising:

a variable displacement pump selectively communicating with the valve actuators through a trip valve, the trip valve hydraulically positioned through a first valve means; the first valve means having first and second positions for respectively pressurizing and venting the trip valve;

a manual pump selectively communicating with the valve actuators through a selector valve; and, a hydraulic circuit communicating the variable displacement pump and the manual pump with the value actuators, the hydraulic circuit including a second valve means; the second valve means having first and second positions for. venting and pressurizing a portion of the hydraulic circuit during variable displacement pump operation and manual pump operation, respectively; the first and second valves being closed when the first and second valve means are in their vented positions.

2. A valve actuating system for selectively operating a pair of valves, including:

A. a first valve having an open and closed position and including a first spring biasing the first valve toward its closed position;

B. a second valve having an open and closed position and including a second spring biasing the second valve toward its closed position;

C. a first hydraulic actuator for controlling the first valve, the first actuator including:
  i. a first port for admitting pressurized fluid to the first actuator to move the first valve toward its open position, and
  ii. a second port for admitting pressurized fluid to the first actuator to move the first valve toward its closed position;

D. a second hydraulic actuator for controlling the second valve, the second actuator including:
  i. a first port for admitting pressurized fluid to the second actuator to move the second valve toward its open position, and
  ii. a second port for admitting pressurized fluid to the second actuator to move the second valve toward its closed position;

E. a first conduit in communication with the first port of the first actuator and the second port of the second actuator;

F. a second conduit in communication with the first port of the second actuator and the second port of the first actuator; and G. means for selectively introducing pressurized fluid into the first and second conduits including:
  a. a reversible variable displacement pump;
  b. a manually operable pump;
  c. a first solenoid valve means having a first position when energized and a second position when de-energized;
  d. a second solenoid valve means having a first position when energized and a second position when de-energized; and,
  e. a hydraulic circuit interconnecting the reversible variable displacement pump, the manually operable pump, and the first and second solenoid valve means wherein:
    i. the reversible variable displacement pump selectively introduces pressurized fluid into the conduits when the first and second valve means occupy their first positions,
    ii. the manually operable pump selectively introduces pressurized fluid into the conduits when the first and second valve means occupy their second positions, and,
    iii. the springs close the valves when the first valve means occupies its second position and the second valve means occupies its first position.

3. A valve actuating system for operating first and second spring biased valves through first and second fluidly cross-connected hydraulic valve actuators supplied from a hydraulic system, the hydraulic system comprising:

a first conduit connected at one end to the hydraulic system and connected at the other end to said first and second hydraulic valve actuators;

a second conduit connected at one end to the hydraulic system and connected at the other end to said first and second valve actuators;

an automatic hydraulic circuit including a variable displacement, reversible pump, a first valve means and selectively positionable trip valve connected to said first and second conduits; and;

a manual hydraulic circuit including a manual pump, a second valve means and selectively positionable selector valve connected to said first and second conduits; said variable displacement reversible pump and said manual pump selectively communicating with said first and second conduits depending upon the position of said first and second valve means.

4. The hydraulic system recited in claim 3 wherein the variable displacement reversible pump communicates with said first and second conduits when said first valve means occupies a first position and said second valve means is vented.

5. The hydraulic system recited in claim 3 wherein the manual pump communicates with said first and second conduits when said first valve means is vented and said second valve means occupies a second position.

\* \* \* \* \*